(12) United States Patent
Liang et al.

(10) Patent No.: US 11,848,464 B1
(45) Date of Patent: Dec. 19, 2023

(54) END COVER ASSEMBLY, ENERGY STORAGE APPARATUS AND ELECTRIC DEVICE

(71) Applicants: Shenzhen Hairun New Energy Technology Co., Ltd., Shenzhen (CN); Xiamen Hithium Energy Storage Technology Co., Ltd., Xiamen (CN)

(72) Inventors: Jinyun Liang, Xiamen (CN); Liangliang Zhang, Xiamen (CN); Wancai Zhang, Xiamen (CN); Ming Yang, Xiamen (CN)

(73) Assignees: Shenzhen Hithium Energy Storage Technology Co., Ltd., Shenzhen (CN); Xiamen Hithium Energy Storage Technology Co., Ltd., Xiamen (CN)

( * ) Notice: Subject to any disclaimer, the term of this patent is extended or adjusted under 35 U.S.C. 154(b) by 0 days.

(21) Appl. No.: 18/109,339

(22) Filed: Feb. 14, 2023

(30) Foreign Application Priority Data

Nov. 11, 2022 (CN) .......................... 202211412892.7

(51) Int. Cl.
*H01M 50/15* (2021.01)
*H01M 50/564* (2021.01)
*H01M 50/342* (2021.01)
*H01M 50/55* (2021.01)

(52) U.S. Cl.
CPC ......... *H01M 50/564* (2021.01); *H01M 50/15* (2021.01); *H01M 50/3425* (2021.01); *H01M 50/55* (2021.01)

(58) Field of Classification Search
CPC .................................................... H01M 50/15
See application file for complete search history.

(56) References Cited

U.S. PATENT DOCUMENTS

2010/0143792 A1   6/2010  Kim
2019/0181417 A1*  6/2019  Wakimoto .......... H01M 50/169

FOREIGN PATENT DOCUMENTS

| CN | 106450049 A   | 2/2017  |
| CN | 206806373 U   | 12/2017 |
| CN | 213278202 U   | 5/2021  |
| CN | 216120451 U   | 3/2022  |
| CN | 216120508 U   | 3/2022  |
| CN | 217405632 U   | 9/2022  |
| JP | 2021028888 A  | 2/2021  |

* cited by examiner

*Primary Examiner* — Brian R Ohara
(74) *Attorney, Agent, or Firm* — IPro, PLLC

(57) ABSTRACT

Disclosed are an end cover assembly, an energy storage apparatus and an electric device. The end cover assembly includes an end cover, a terminal assembly and a top adhesive sheet, and the end cover has a first surface and a second surface opposite to each other in the thickness direction thereof; the terminal assembly is disposed on the end cover; and the top adhesive sheet is attached to the first surface of the end cover, the top adhesive sheet is provided with a first opening through which the terminal assembly penetrates. According to the present application, the attaching difficulty of the top adhesive sheet on the end cover can be reduced, and the attaching efficiency is improved; and the size of the first opening is more reasonable, an insulation effect is ensured, a probability of foreign matter accumulation is reduced, and the use safety is improved.

19 Claims, 4 Drawing Sheets

END COVER ASSEMBLY, ENERGY STORAGE APPARATUS AND ELECTRIC DEVICE

CROSS REFERENCE TO RELATED APPLICATIONS

The disclosure claims priority to Chinese Patent Application No. 202211412892.7 filed to the State Intellectual Property Office of China on Nov. 11, 2022 and entitled "End Cover Assembly, Energy Storage Apparatus and Electric device", which is incorporated herein by reference in its entirety.

TECHNICAL FIELD

The present application relates to the technical field of batteries, in particular to an end cover assembly, an energy storage apparatus and an electric device.

BACKGROUND

In a battery assembly process, it is necessary to attach a top adhesive sheet to an end cover to realize insulation of the end cover. In an attaching process, it is difficult for the top adhesive sheet to align with the end cover, and the attaching efficiency is low.

SUMMARY

The present application aims to solve at least one of the technical problems existing in the prior art. For this reason, the present application provides an end cover assembly, and the attaching efficiency of a top adhesive sheet on an end cover is higher.

The present application further provides an energy storage apparatus adopting the above end cover assembly.

The present application further provides an electric device.

The end cover assembly according to an embodiment of a first aspect of the present application includes an end cover, a terminal assembly and a top adhesive sheet, and the end cover has a first surface and a second surface opposite to each other in the thickness direction thereof; the terminal assembly is disposed on the end cover; and the top adhesive sheet is attached to the first surface of the end cover, the top adhesive sheet is provided with a first opening through which the terminal assembly penetrates, a maximum length L1 of the first opening in a length direction of the end cover and a maximum length L2 of the terminal assembly in the length direction meet: $0.6 \text{ mm} \leq L1-L2 \leq 1 \text{ mm}$, and a maximum width W1 of the first opening in a width direction of the end cover and a maximum width W2 of the terminal assembly in the width direction meet: $0.6 \text{ mm} \leq W1-W2 \leq 1 \text{ mm}$.

According to the embodiments of the present application, disposing the top adhesive sheet and making a length size difference and a width size difference between the first opening of the top adhesive sheet and the terminal assembly meet the above limitation, on the one hand, the end cover assembly may reduce the attaching difficulty of the top adhesive sheet on the end cover, and improve the attaching efficiency. On the other hand, the size of the first opening is more reasonable. It can avoid too large spacing between the terminal assembly and the top adhesive sheet, so as to ensure an insulation effect, reduce a probability of dust and foreign matter accumulation, and improve the use safety; and it can also avoid too small spacing between the terminal assembly and the top adhesive sheet, so as to reduce the assembly difficulty between the end cover and the top adhesive sheet and improve the assembly efficiency.

According to some embodiments of the present application, a projection of the terminal assembly on the first surface in the thickness direction of the end cover is a first projection, a contour of the first projection is circular, the first opening is circular, and a radius r1 of the first opening and a radius r2 of the first projection meet: $0.35 \text{ mm} \leq r1-r2 \leq 0.45 \text{ mm}$. Therefore, in an attaching process, a maximum allowable size spacing between the top adhesive sheet and the terminal assembly on a single side in the length direction or the width direction reaches 0.9 mm, a larger adjustment margin is realized, and the attaching difficulty is further reduced.

Optionally, on the first surface, a gap C1 between the terminal assembly and the first opening meets: $0.35 \text{ mm} \leq C1 \leq 0.45 \text{ mm}$, which can ensure that a peripheral edge of the first opening will not be in contact with the terminal assembly, can avoid the phenomenon of local cocking or lax attachment of the top adhesive sheet, can improve the attaching effect and reduce the probability of foreign matter accumulation.

In some embodiments, the end cover assembly further includes: a pressure relief mechanism, the pressure relief mechanism is disposed on the end cover, the top adhesive sheet is further provided with a second opening for the pressure relief mechanism to penetrate through, a maximum length L3 of the second opening in the length direction and a maximum length L4 of the pressure relief mechanism in the length direction meet: $0.6 \text{ mm} \leq L3-L4 \leq 1 \text{ mm}$, and a maximum width W3 of the second opening in the width direction and a maximum width W4 of the pressure relief mechanism in the width direction meet: $0.6 \text{ mm} \leq W3-W4 \leq 1 \text{ mm}$.

Therefore, the size of the second opening for avoiding the pressure relief mechanism is larger than the size of the pressure relief mechanism, in the length direction, a width median line of the second opening and a width median line of the pressure relief mechanism may overlap or stagger, and correspondingly, in the width direction, a length median line of the second opening and a length median line of the pressure relief mechanism may overlap or stagger. When corresponding to overlapping, spacings between two side edges of width and length are all 0.3 mm-0.5 mm, however, when corresponding to staggering, a maximum spacing on a single side may reach 0.6 mm-1 mm, and the larger adjustment margin is reserved. In the attaching process, it is easier to attach, and the attaching difficulty can be reduced.

Further, a projection of the pressure relief mechanism on the first surface in the thickness direction of the end cover is a second projection, a contour of the second projection is oblong, the second opening is an oblong hole, and in the width direction, a radius r3 of a semicircular region of the second opening and a radius r4 of a semicircular region of the second projection meet: $0.35 \text{ mm} \leq r3-r4 \leq 0.45 \text{ mm}$.

Therefore, a radius difference between the two is limited to be 0.35 mm-0.45 mm, the maximum adjustment margin in the width direction is 0.9 mm, one side edge of the second opening and one side edge of the pressure relief mechanism in the width direction are in fit, and a maximum spacing of the other side edges may reach 0.9 mm. At this time, there may also not be an overlapping region between the second opening and the pressure relief mechanism in the length direction, which can effectively prevent the top adhesive sheet from shielding the pressure relief mechanism, and the phenomenon of local cocking of the top adhesive sheet can also be avoided while the working stability of the pressure relief mechanism is improved, thereby improving the attaching effect.

Optionally, on the first surface, a gap C2 between the pressure relief mechanism and the second opening meets: 0.35 mm≤C2≤0.45 mm. In this way, on the premise of realizing the technical effect of the above attachment convenience, by further limiting the gap between the two to be no less than 0.35 mm, it can be ensured that the peripheral edge of the second opening will not be in contact with the pressure relief mechanism, which can avoid the phenomenon of local cocking or lax attachment of the top adhesive sheet, the attaching effect can be improved, at the same time, the top adhesive sheet can be prevented from covering the pressure relief mechanism, it is ensured that the pressure relief mechanism may stably and reliably preform pressure relief work, the safety is improved, and the probability of foreign matters accumulated around the pressure relief mechanism can also be reduced.

According to some embodiments of the present application, the top adhesive sheet is provided with at least one third opening to expose part of the outer surface of the end cover, so as to facilitate the contact or connection among a temperature test element, a voltage test element and the end cover, improve the test convenience and improve the test accuracy.

Further, the outer surface of the end cover is provided with at least one identification code, and the at least one third opening is disposed directly facing the at least one identification code, which can make identification of the identification code simpler and more convenient, and provide convenience for subsequent maintenance, traceability and the like of a single battery.

Further, a maximum length L5 of the end cover in the length direction and a maximum length L6 of the top adhesive sheet in the length direction meet 1 mm≤L5-L6≤4 mm; and a maximum width W5 of the end cover in the width direction and a maximum width W6 of the top adhesive sheet in the width direction meet 1 mm≤W5-W6≤4 mm.

Therefore, a minimum distance between the top adhesive sheet and the end cover in the length direction and the width direction is 1 mm. It can ensure that the top adhesive sheet is located on the first surface of the end cover, and the top adhesive sheet is completely attached to the end cover, the attaching effect is improved, a maximum spacing distance does not exceed 4 mm, and the spacing distance is reasonable, which can improve the insulation stability and reliability of the top adhesive sheet.

Further, a distance L7 between one side edge of the top adhesive sheet in the length direction and the same side edge of the end cover in the length direction meets: 0.5 mm≤L7≤2 mm; and a distance W7 between one side edge of the top adhesive sheet in the width direction and the same side edge of the end cover in the width direction meets: 0.5 mm≤W7≤2 mm.

In this way, on the one hand, it can be ensured that the peripheral edge of the top adhesive sheet is located within the peripheral edge of the end cover, the attaching effect is improved, it is ensured that there is no phenomenon of edge cocking, and there is no bending region on the top adhesive sheet. Even if there are bubbles, the top adhesive sheet can be smoothed manually to drive out the bubbles, and the removal of the bubbles is simple and convenient. On the other hand, distances between the side edges of the end cover and the top adhesive sheet are more reasonable, and the attractiveness of the end cover assembly can be improved on the premise of ensuring the insulation effect.

In some embodiments, two terminal assemblies are disposed on the end cover, and a spacing L10 between the two terminal assemblies and the maximum length L4 of the pressure relief mechanism in the length direction meet: 0.1≤L4/L10≤0.4.

Therefore, the situation that the pressure relief speed is low as the pressure relief mechanism is too small may be avoided, so as to improve the safety, the pressure relief mechanism may also be prevented from being too large, so as to reduce the probability of false triggering of the pressure relief mechanism under the same pressure, and the working stability and reliability of the pressure relief mechanism are improved.

An energy storage apparatus according to an embodiment of a second aspect of the present application includes the end cover assembly in the above embodiment.

According to some embodiments of the present application, the energy storage apparatus further includes a housing, and the end cover is disposed to cover the housing; and the housing is coated with an insulating film, the insulating film extends to cover the end cover, and a length L8 of the insulating film extending along the end cover from an edge of the end cover is ≥2 mm, so as to insulate the housing through the insulating film, and the insulating film extends to cover the end cover, which can improve the insulation effect of the insulating film.

Further, a length L9 of an overlapping region of the top adhesive sheet and the insulating film is 1 mm≤L9≤2 mm. In this way, on the one hand, the top adhesive sheet overlaps with at least part of the insulating film, which can ensure that the housing and the end cover are separated from the outside, so as to improve the insulation effect of the housing and the end cover. On the other hand, an area of the overlapping region is more reasonable, which can improve the attaching stability and reliability of the top adhesive sheet, and effectively reduce the material cost.

An electric device according to an embodiment of a third aspect of the present application includes the energy storage apparatus in the above embodiment.

Part of additional aspects and advantages of the present application will be given in the following description, and part thereof become apparent in the following description or known by practice from the present application.

BRIEF DESCRIPTION OF FIGURES

The above-mentioned and/or additional aspects and advantages of the present application will become apparent and understandable in the description for embodiments in conjunction with the following accompanying drawings, in which.

Figure 1:
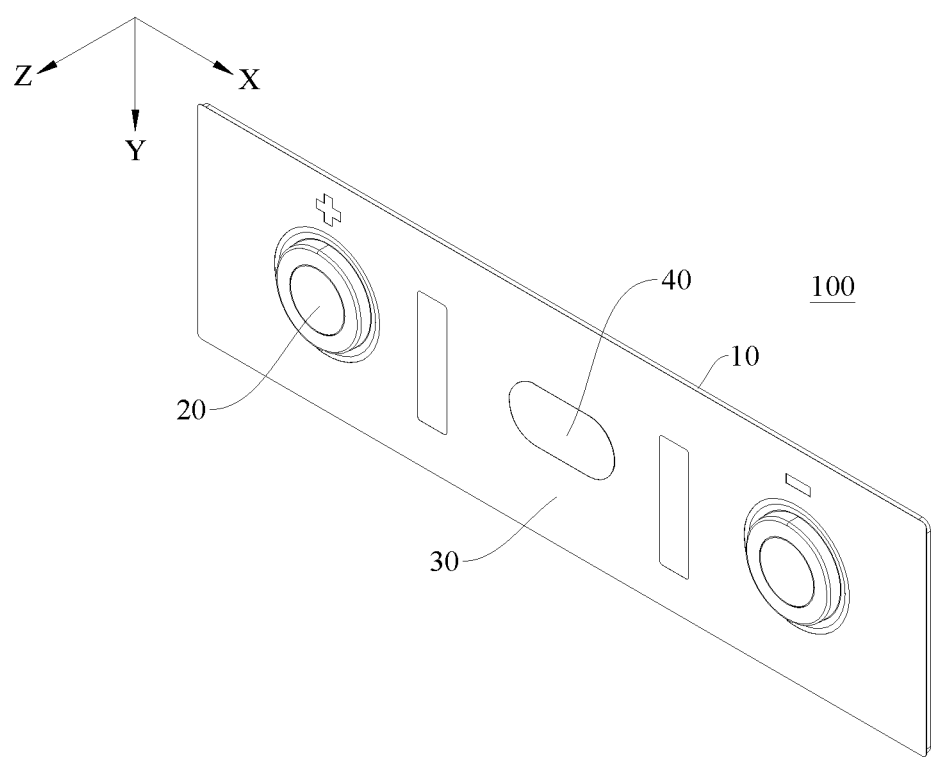
FIG. 1 is a schematic diagram of an end cover assembly according to an embodiment of the present application.

REFERENCE NUMERALS IN THE ACCOMPANYING DRAWINGS 01, electric device;
1000, energy storage apparatus;
100, end cover assembly; 200, housing; 300, electrode assembly; 400, insulating film;
10, end cover; 11, liquid injection mechanism; 111, liquid injection hole; 112, sealing nail; 12, concave part;
20, terminal assembly; 21, connecting piece;
30, top adhesive sheet; 31, first opening; 32, second opening; 33, electrode label; 34, third opening;
40, pressure relief mechanism; 50, separator;
X, length direction; Y, width direction; Z, thickness direction.

DETAILED DESCRIPTION

The embodiments of the present application will be described in detail below, and examples of the embodiments are shown in the accompanying drawings, wherein same or similar numerals throughout indicate same or similar elements or elements with same or similar functions. The embodiments described below with reference to the accompanying drawings are exemplary, and are only intended to explain the present application, rather than to be understood as limitations to the present application.

In the description of the present application, it should be noted that directional or positional relationships indicated by terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" are directional or positional relationships as shown based on the accompanying drawings, and are only for the purposes of facilitating describing the present application and simplifying the description, rather than indicating or implying that the referred apparatus or element has to have a specific direction or be constructed and operated in the specific direction, and therefore, they cannot be regarded as limitations to the present application. Furthermore, the features defined as "first" and "second" may explicitly or implicitly include one or more of the features. In the description of the present application, unless otherwise specified, "a plurality of" means two or more.

In the description of the present application, it should be noted that the terms "mounted", "connected" and "connection" should be understood in a broad sense unless otherwise specified and defined, for example, "connection" may be fixed connection or detachable connection or integrated connection, may be mechanical connection or electric connection, may be direct connection or indirect connection through an intermediate medium, and may be internal communication of two elements. For those ordinary skilled in the art, the specific meanings of the above terms in the present application may be understood according to specific situations.

Next, an end cover assembly 100, an energy storage apparatus 1000 and an electric device 01 according to the embodiments of the present application are described with reference to FIG. 1 to FIG. 7.

Figure 2:
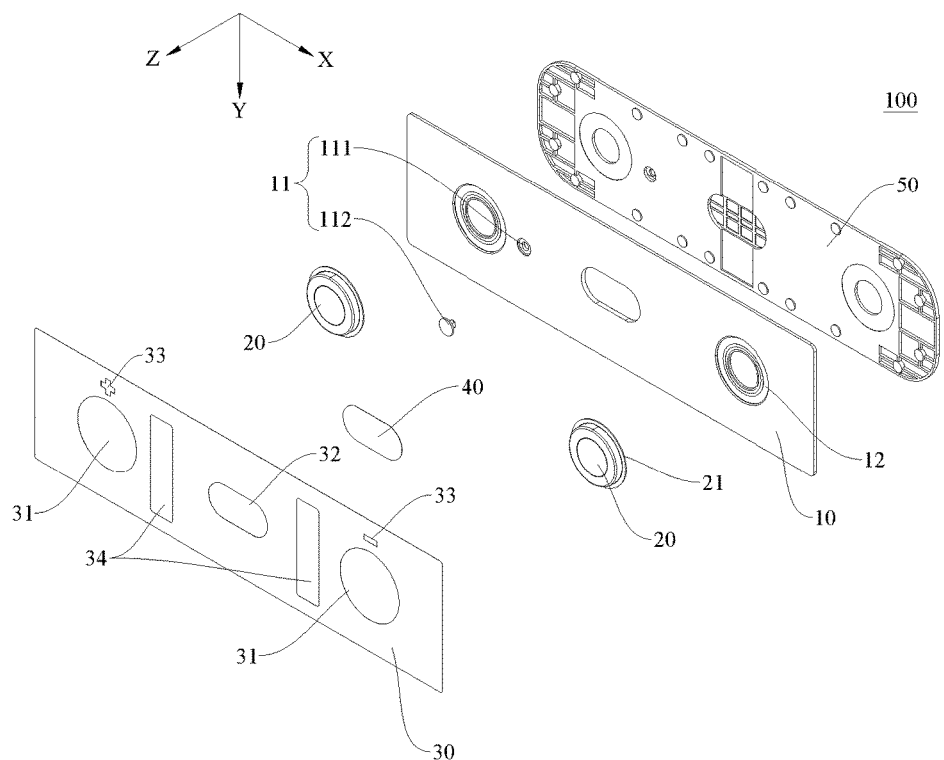
FIG. 2 is a schematic diagram of disassembly of an end cover assembly according to an embodiment of the present application.

As shown in FIG. 1 and FIG. 2, the end cover assembly 100 according to an embodiment of a first aspect of the present application includes: an end cover 10, a terminal assembly 20 and a top adhesive sheet 30.

The terminal assembly 20 may include an electrode terminal and a connecting piece 21, the connecting piece 21 is a component configured to fix the electrode terminal (namely, a pole) to the end cover 10, and the electrode terminal is a component configured to output electric energy of a single battery.

A separator 50 is a component that separates the end cover 10 from an electrode assembly 300, the separator 50 is disposed on one side of the end cover 10 facing the electrode assembly 300, and the insulation isolation between the end cover 10 and the electrode assembly 300 is realized through the separator 50. The separator 50 is made of insulating materials, and the separator 50 may also be made of materials such as plastic and rubber.

Figure 3:
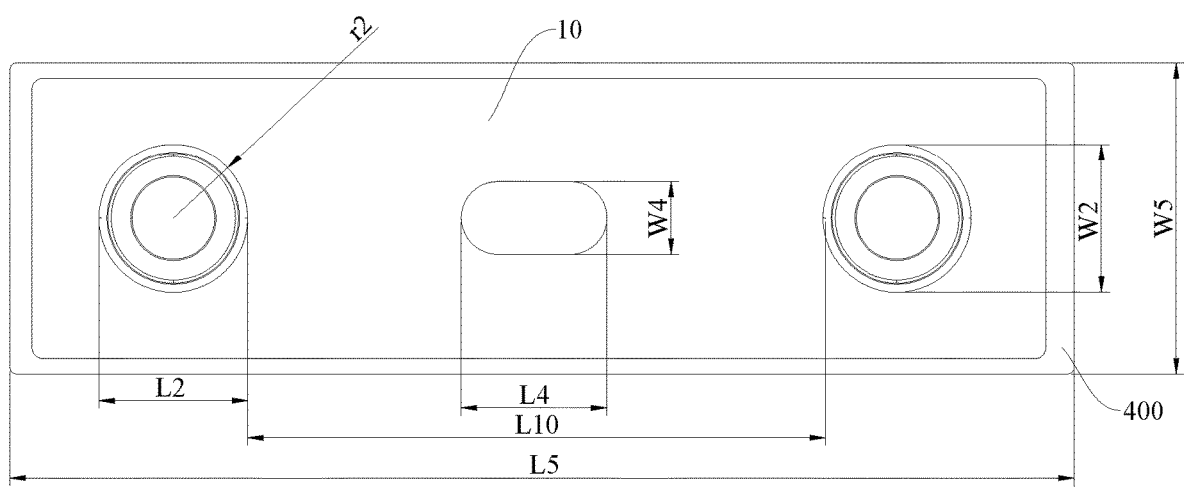
FIG. 3 is a schematic diagram of matching between an end cover and an insulating film according to an embodiment of the present application.
Figure 4:
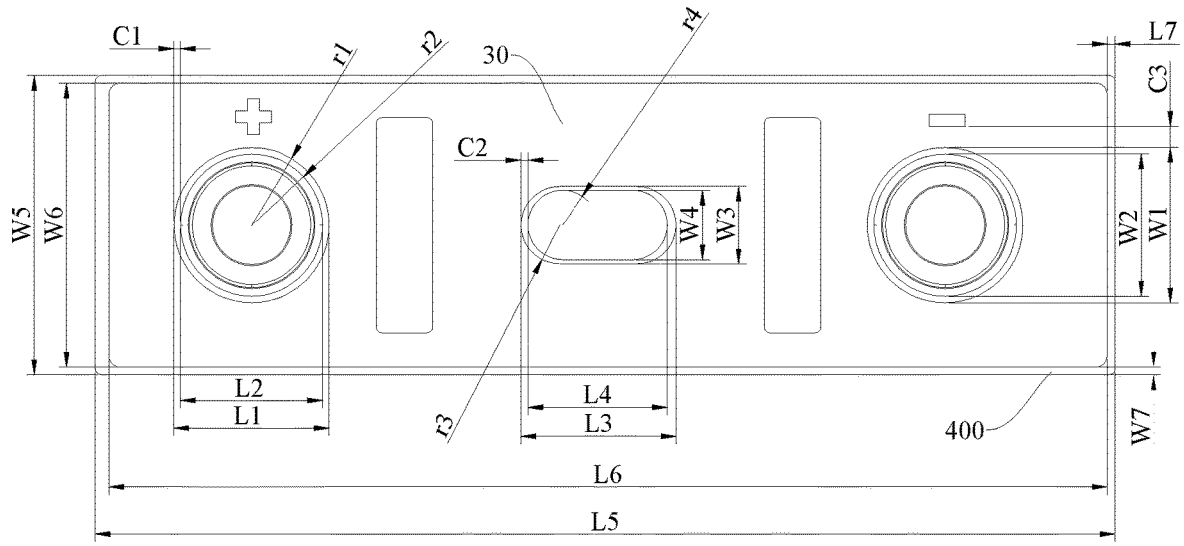
FIG. 4 is a schematic diagram of matching between an end cover and a top adhesive sheet according to an embodiment of the present application.
Figure 5:
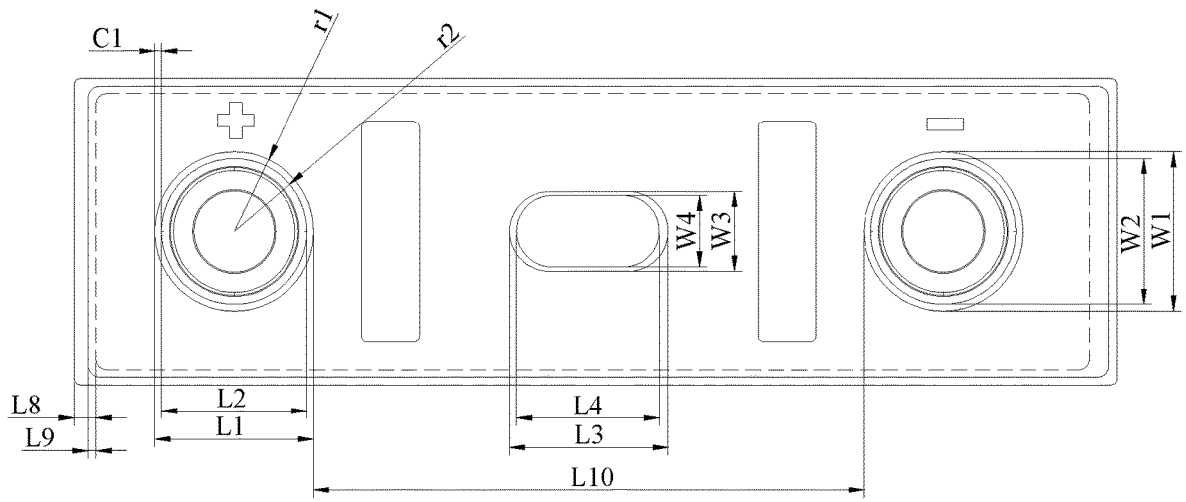
FIG. 5 is a schematic diagram of matching among an end cover, an insulating film and a top adhesive sheet according to an embodiment of the present application (the insulating film is shown by dotted lines).
Figure 6:
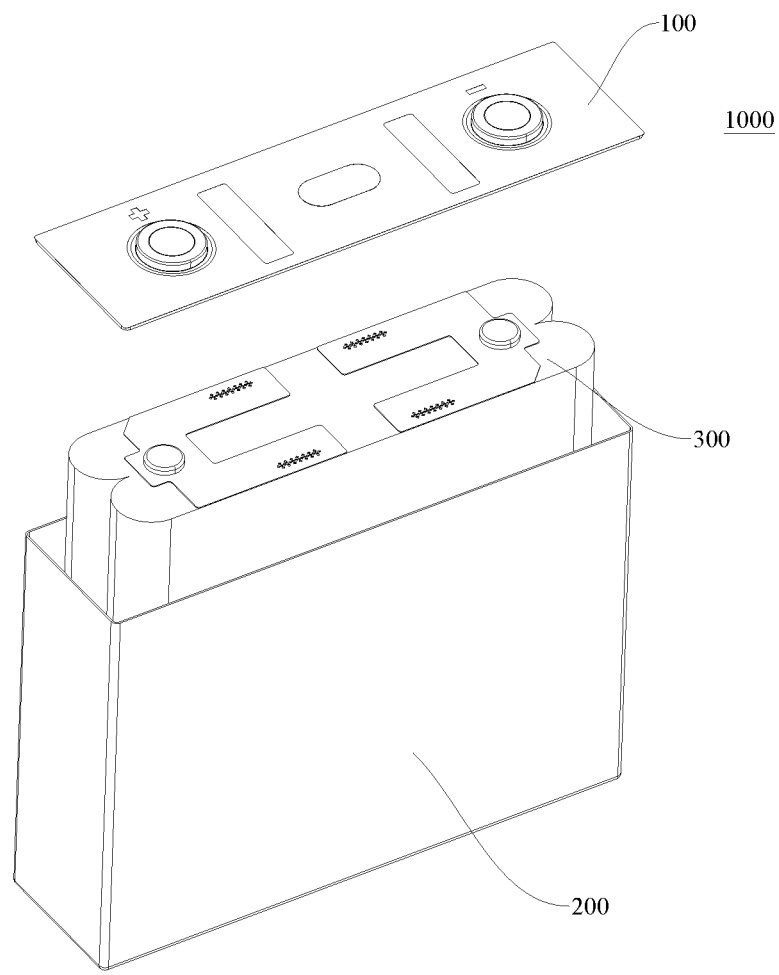
FIG. 6 is a schematic diagram of an energy storage apparatus according to an embodiment of the present application.

Specifically, as shown in FIG. 3, FIG. 4 and FIG. 5, the end cover 10 has a first surface and a second surface opposite to each other in the thickness direction thereof; the terminal assembly 20 is disposed on the end cover 10; and the top adhesive sheet 30 is attached to the first surface of the end cover 10, the top adhesive sheet 30 is provided with a first opening 31 through which the terminal assembly 20 penetrates, a maximum length L1 of the first opening 31 in a length direction of the end cover 10 and a maximum length L2 of the terminal assembly 20 in the length direction meet: 0.6 mm≤L1-L2≤1 mm, and a maximum width W1 of the first opening 31 in a width direction of the end cover 10 and a maximum width W2 of the terminal assembly 20 in the width direction meet: 0.6 mm≤W1-W2≤1 mm.

The top adhesive sheet 30 is disposed opposite to the end cover 10, the top adhesive sheet 30 moves towards the end cover 10, or the end cover 10 moves towards the top adhesive sheet 30, and one side of the top adhesive sheet 30 facing the end cover 10 is provided with an adhesion layer, so as to realize the attachment between the end cover 10 and the top adhesive sheet 30. However, the sizes of the first opening 31 in the length direction and the width direction of the end cover 10 are both larger than the sizes of the terminal assembly 20 in the length direction and the width direction of the end cover 10, in the attaching process, the margin during alignment of the end cover 10 and the top adhesive sheet 30 is larger, and the requirement for coaxiality is lower, which can improve the attaching efficiency.

It can be understood that a maximum length difference between the two in the length direction is 0.6 mm-1 mm, and a maximum width difference between the two in the width direction is 0.6 mm-1 mm. On the one hand, the coaxiality has an alignment margin of 0.6 mm-1 mm, which can reduce the coaxiality requirement, so as to improve the attaching efficiency. On the other hand, the size margin is more reasonable, which can avoid too large or too small spacing between the end cover 10 and the top adhesive sheet 30, so as to improve the attaching quality.

It should be noted that if the spacing between the end cover 10 and the top adhesive sheet 30 is too large, an area of an exposed region of the end cover 10 is too large to ensure the insulation effect, dust and foreign matters are prone to being accumulated in the spacing region, and the use safety is reduced; and if the spacing is too small, the assembly difficulty between the end cover 10 and the top adhesive sheet 30 is high, and rapid assembly is hardly realized.

The present application does not specifically define the shapes of the terminal assembly 20 and the first opening 31, the two keep the same contour, the length size and the width size of the first opening 31 and the length size and the width size of the terminal assembly 20 meet the above limitation, and the terminal assembly 20 may be a cylinder, a long cylinder or a prism.

According to the end cover assembly 100 of the embodiment of the present application, by disposing the top adhesive sheet 30 and making a length size difference and a width size difference between the first opening 31 of the top adhesive sheet 30 and the terminal assembly 20 meet the above limitation, on the one hand, the attaching difficulty of the top adhesive sheet 30 on the end cover 10 can be reduced, and the attaching efficiency is improved. On the other hand, the size of the first opening 31 is more reasonable, which can avoid too large spacing between the terminal assembly 20 and the top adhesive sheet 30, so as to ensure an insulation effect, reduce a probability of dust and foreign matter accumulation, and improve the use safety; and can also avoid too small spacing between the terminal assembly 20 and the top adhesive sheet 30, so as to reduce the assembly difficulty between the end cover 10 and the top adhesive sheet 30 and improve the assembly efficiency.

As shown in FIG. 1 and FIG. 2, preferably, a projection of the terminal assembly 20 on the first surface in the thickness direction of the end cover 10 is a first projection, a contour of the first projection is circular, and a radius r1 of the first opening 31 and a radius r2 of the first projection meet: $0.35\ mm \leq r1\text{-}r2 \leq 0.45\ mm$.

Specifically, in a preferred embodiment, the terminal assembly 20 is configured as a cylinder, while the first opening 31 may be correspondingly formed as a circular hole, the terminal assembly 20 is sleeved with the circular hole, a radius difference between the two is limited to be 0.35 mm-0.45 mm, that is, the size differences between the two in the length direction and the width direction both fall within a size range of 0.6 mm-1 mm, so as to ensure that the cylindrical terminal assembly 20 also has the above technical effect.

More importantly, the radius difference between the two is 0.35 mm-0.45 mm, and distances between the peripheral edges of the two and the center of each other are equal. In the attaching process, the maximum allowable size spacing between the top adhesive sheet 30 and the terminal assembly 20 on a single side in the length direction or the width direction may reach 0.9 mm, a larger adjustment margin is realized, and the attaching difficulty is further reduced.

As shown in FIG. 4 and FIG. 5, on the first surface, a gap C1 between the terminal assembly 20 and first opening 31 meets: $0.35\ mm \leq C1 \leq 0.45\ mm$.

That is, while making the size differences between the first opening 31 and the terminal assembly 20 in the width direction and the length direction be 0.6 mm-1 mm, the gap between the first opening 31 and the terminal assembly 20 is further limited to be no less than 0.35 mm and no larger than 0.45 mm.

Exemplarily, the terminal assembly 20 is a cylinder, a radius difference between the first opening 31 and the terminal assembly 20 is 0.3 mm, then a minimum distance between the peripheral edge of the circular terminal assembly 20 and the first opening 31 may be 0.35 mm, and a maximum distance may be 0.45 mm. the terminal assembly 20 is a cube, a size difference between the first opening 31 and the terminal assembly 20 in the length direction is 0.6 mm, a size difference in the width direction is 0.6 mm, then a minimum distance between the two in the length direction correspondingly is 0.35 mm, a maximum distance is 0.45 mm, however, a minimum distance in the width direction is 0.35 mm, and a maximum distance is 0.45 mm.

Therefore, on the premise of realizing the technical effect of the above attachment convenience, by further limiting the gap between the two to be no less than 0.35 mm and no larger than 0.45 mm, it can be ensured that the peripheral edge of the first opening 31 will not be in contact with the terminal assembly 20, which can avoid the phenomenon of local cocking or lax attachment of the top adhesive sheet 30, the attaching effect can be improved, at the same time, too large gap is avoided, so as to reduce the probability of dust and foreign matter accumulation.

As shown in FIG. 1 and FIG. 2, in some embodiments, the end cover assembly 100 further includes: a pressure relief mechanism 40, the pressure relief mechanism 40 is disposed to cover the end cover 10, the top adhesive sheet 30 is further provided with a second opening 32 for the pressure relief mechanism 40 to penetrate through, a maximum length L3 of the second opening 32 in the length direction and a maximum length L4 of the pressure relief mechanism 40 in the length direction meet: $0.6\ mm \leq L3\text{-}L4 \leq 1\ mm$, and a maximum width W3 of the second opening 32 in the width direction and a maximum width W4 of the pressure relief mechanism 40 in the width direction meet: $0.6\ mm \leq W3\text{-}W4 \leq 1\ mm$.

The pressure relief mechanism 40 is a component for releasing pressure inside the single battery. The pressure relief mechanism 40 is disposed on the end cover 10, and when the pressure or temperature inside the single battery reaches a threshold, the pressure inside the single battery is released through the pressure relief mechanism 40. The pressure relief mechanism 40 may be a component such as an anti-explosion valve, an anti-explosion patch and a pressure relief valve.

That is, the size of the second opening 32 for avoiding the pressure relief mechanism 40 is larger than the size of the pressure relief mechanism 40, in the length direction, a width median line of the second opening 32 and a width median line of the pressure relief mechanism 40 may overlap or stagger, and correspondingly, in the width direction, a length median line of the second opening 32 and a length median line of the pressure relief mechanism 40 may overlap or stagger. When corresponding to overlapping, spacings between two side edges of width and length are all 0.3 mm-0.5 mm, however, when corresponding to staggering, a maximum spacing on a single side may reach 0.6 mm-1 mm, and the larger adjustment margin is reserved. In the attaching process, it is easier to attach, and the attaching difficulty can be reduced.

Preferably, as shown in FIG. 3, FIG. 4 and FIG. 5, a projection of the pressure relief mechanism 40 in the thickness direction of the end cover 10 is a second projection, a contour of the second projection is oblong, the second opening 32 is an oblong hole, and in the width direction, a radius r4 of a semicircular region of the second projection and a radius r3 of a semicircular region of the waist-round hole meet: $0.35\ mm \leq r3\text{-}r4 \leq 0.45\ mm$.

Specifically, in a preferred embodiment, the pressure relief mechanism is configured as oblong, such as an oblong anti-explosion patch. The pressure relief mechanism 40 includes a rectangular part and two semicircular parts located at two ends of the rectangular part in the length direction, the radii of the two semicircular parts are both r4, double r4 is the width size of the pressure relief mechanism 40, the radii of two semicircular regions of the second opening 32 disposed corresponding to the two semicircular parts are r3, and double r3 is the width size of the second opening 32.

Furthermore, a radius difference between the two is limited to be 0.35 mm-0.45 mm, the maximum adjustment margin in the width direction is 0.9 mm, one side edge of the second opening 32 and one side edge of the pressure relief mechanism 40 in the width direction are in fit, and a maximum spacing of the other side edges may reach 0.9 mm. At this time, there may also not be an overlapping region between the second opening 32 and the pressure relief mechanism 40 in the length direction, which can effectively prevent the top adhesive sheet 30 from shielding the pressure relief mechanism 40, and the phenomenon of local cocking of the top adhesive sheet 30 can also be avoided while the working stability of the pressure relief mechanism 40 is improved, thereby improving the attaching effect.

As shown in FIG. 4, on the first surface, a gap C2 between the pressure relief mechanism 40 and the second opening 32 meets: $0.35\ \text{mm} \leq C2 \leq 0.45\ \text{mm}$.

That is, while making the size differences between the second opening 32 and the pressure relief mechanism 40 in the width direction and the length direction be 0.6 mm-1 mm, the gap between the first opening 31 and the pressure relief mechanism 40 is further limited to be no less than 0.35 mm and no larger than 0.45 mm.

Exemplarily, the pressure relief mechanism 40 is the anti-explosion patch, a size difference between the second opening 32 and the anti-explosion patch in the length direction is 0.6 mm, a size difference in the width direction is 0.6 mm, then a minimum distance between the two in the length direction correspondingly is 0.35 mm, a maximum distance is 0.45 mm, however, a minimum distance in the width direction is 0.35 mm, and a maximum distance is 0.45 mm.

In this way, on the premise of realizing the technical effect of the above attachment convenience, by further limiting the gap between the two to be no less than 0.35 mm, it can be ensured that the peripheral edge of the second opening 32 will not be in contact with the pressure relief mechanism 40, which can avoid the phenomenon of local cocking or lax attachment of the top adhesive sheet 30, the attaching effect can be improved, at the same time, the top adhesive sheet 30 can be prevented from covering the pressure relief mechanism 40, it is ensured that the pressure relief mechanism 40 may stably and reliably preform pressure relief work, the safety is improved, the gap is more reasonable, and the probability of foreign matters accumulated around the pressure relief mechanism 40 can also be reduced.

As shown in FIG. 1 and FIG. 2, according to some embodiments of the present application, the top adhesive sheet 30 is provided with at least one third opening 34, so as to expose part of an outer surface of the end cover 10.

It should be noted that in order to slow down an oxidation rate of the end cover 10 and a housing 200 of the single battery 1000, the end cover 10 and the single battery 1000 are generally positively charged. When the voltage of the single battery 1000 is measured, one electrical connecting piece of a voltage test element may be directly lapped on the end cover 10. When the temperature of the single battery 1000 is measured, a test part of a temperature test element needs to be in contact with the end cover 10.

Based on this, in the present application, the top adhesive sheet 30 is further provided with a third opening 34 to expose at least part of the outer surface of the end cover 10, so as to facilitate the lapping of the electrical connecting piece of the voltage test element and the end cover 10 and the contact between the test part of the temperature test element and the end cover 10, the test part of the temperature test element may be in direct contact with the end cover 10 while the voltage test is facilitated, and the temperature test accuracy may also be improved.

In some embodiments, the outer surface of the end cover 10 is provided with at least one identification code, and the at least one third opening 34 is disposed directly facing the at least one identification code.

The identification code may be a two-dimensional code, a bar code and the like, the identification code may be identified, and at least may be used to identify a series of safety scalars of the single battery 1000, such as the capacity, a maximum allowable voltage and a maximum discharge current, as well as traceable scalars such as a production batch, data and a factory. The third opening 34 is configured to expose the identification code, the identification convenience of the identification code is improved, and convenience may also be provided for subsequent maintenance and traceability of the single battery 1000.

It can be understood that the identification code on the end cover 10 may be printed on the end cover 10 in a rolling mode, that is, a plurality of identification codes are disposed on the outer surface of the end cover 10, only one third opening 34 exposes one of the identification codes, and the top adhesive sheet 30 completely covers the other identification codes.

In this way, on the one hand, the plurality of identification codes are printed in a rolling mode, and when the identification codes are printed, it is not necessary to identify the position of the third opening 34 first, and then print accordingly, which can improve the processing efficiency. On the other hand, sizes of the plurality of identification codes are smaller than an opening size of the third opening 34, it can be ensured that the region of the third opening 34 may expose at least one identification code, and after the exposed identification code is erased, the other identification codes covered by the top adhesive sheet 30 may also be used for identification after the top adhesive sheet 30 is uncovered.

In some embodiments, a part of the end cover 10 located in the at least one third opening 34 forms a detection position, and the detection position is a voltage detection position and/or a temperature detection position.

Therefore, the test part of the above temperature test element and the electrical connecting piece of the voltage test element may be disposed on the temperature detection position and the voltage detection position respectively, the test elements on the assembly of the end cover 10 may be fixed to the corresponding detection positions while the temperature detection and the voltage detection are facilitated, the overall wiring may also be more orderly, the fixing stability of the corresponding elements is higher, and the setting position is more reasonable, so as to improve the space occupation.

In the embodiment shown in FIG. 2, according to some embodiments of the present application, the top adhesive sheet 30 is provided with an electrode label 33 close to the terminal assembly 20.

Specifically, the terminal assembly 20 may be connected with a positive pole lug to form a positive terminal, and may also be connected with a negative pole lug to form a negative terminal. The top adhesive sheet 30 is provided with the electrode label 33 correspondingly, the electrode polarity when the end cover assembly 100 is assembled on the housing 200 of the single battery may be conveniently judged, the connection of the terminal assembly 20 and structures such as a busbar and a transfer bar in a process that the single battery is assembled into a battery pack, a battery cluster or a battery module may also be facilitated, the assembly convenience may be further improved, and wrong assembly and assembly by mistake are avoided, so as to improve the assembly safety.

It should be noted that in the assembly process, in case of wrong assembly and assembly by mistake, it may be short circuited, ignited instantly, or even exploded, and the risk is high.

In some embodiments, the electrode label 33 may be a label blind hole formed in the top adhesive sheet 30, and in some other embodiments, the electrode label 33 is a label through hole formed in the top adhesive sheet 30.

Correspondingly, the end cover 10 may be provided with a label bulge that is consistent with the contour shape of the electrode label 33, the label through hole is matched with the label bulge, which can realize the positioning of the top adhesive sheet 30 in the attaching process on the end cover 10, improve the attaching accuracy of the top adhesive sheet 30, and ensure that a liquid injection mechanism 11 may not leak out, and at the same time, the setting of the label through hole region may realize the material reduction setting of the top adhesive sheet 30, so as to reduce the material cost.

Further, two terminal assemblies 20 are disposed at intervals, the top adhesive sheet 30 is provided with the electrode label 33 only corresponding to one of the terminal assemblies 20, or the top adhesive sheet 30 is provided with the electrode label 33 corresponding to each terminal assembly 20.

Specifically, there may be one or two terminal assemblies 20 on the end cover 10. If there is one terminal assembly 20 on the end cover 10, the housing 200 may be of a hollow structure with openings formed in two ends, there are two end cover assemblies 100 in the single battery, the two openings of the housing 200 are covered with the end covers 10 of the two end cover assemblies 100 respectively, and electrode terminals of the terminal assemblies 20 in the two end cover assemblies 100 are electrically connected with a positive pole lug and a negative pole lug of an electrode assembly 300 respectively. If there are two terminal assemblies 20 on the end cover 10, the housing 200 of the single battery may be of a hollow structure with an opening formed in one end, and the electrode terminals in the two terminal assemblies 20 are electrically connected with the positive pole lug and the negative pole lug of the electrode assembly 300 of the single battery respectively.

The electrode terminals in the terminal assemblies 20 may be directly or indirectly connected with the positive pole lug or the negative pole lug of the electrode assembly 300. The situation that the end cover 10 is provided with two terminal assemblies 20 is taken as an example, the electrode terminal of one terminal assembly 20 is electrically connected with the positive pole lug through a current collecting member, and the electrode terminal of the other terminal assembly 20 is electrically connected with the negative pole lug through the other current collecting member.

Further, in the embodiment that the two end covers 10 are respectively provided with one terminal assembly 20, the two end covers 10 have the same structure settings to facilitate assembly. After assembly is completed, only one end cover 10 is provided with the top adhesive sheet 30 with the electrode label 33. In the embodiment that one end cover 10 is provided with two terminal assemblies 20, the top adhesive sheet 30 on the end cover 10 may be provided with the electrode label 33 only corresponding to the positive terminal and/or the negative terminal, so that an operator may reasonably arrange the orientation of the end cover 10 and the layout of the single battery according to the electrode label 33, the assembly of an energy storage apparatus is realized, and the probability of wrong assembly and assembly by mistake is reduced.

As shown in FIG. 4, further, a gap C3 between the electrode label 33 and the first opening 31 meets: 0.35 mm≤C3≤0.45 mm.

Specifically, the electrode label 33 is directly formed on the top adhesive sheet 30, so that a distance between the electrode label 33 and the first opening 31 is not smaller than 0.35 mm and not larger than 0.45 mm. When the first opening 31 and the electrode label 33 are processed on the top adhesive sheet 30, the reasonable distance between the two may prevent the top adhesive sheet 30 from tearing during processing. Before the attachment, the opening region on the top adhesive sheet 30 also has a certain tension, the region of the electrode label 33 or the region of the first opening 31 is prevented from bending or deformation, stacking of the top adhesive sheet 30 itself in the attaching process can be avoided, so as to reduce the attaching difficulty, and the attaching efficiency is improved.

As shown in FIG. 1 and FIG. 2, the end cover 10 is provided with a liquid injection mechanism 11, and the top adhesive sheet 30 completely covers the liquid injection mechanism 11.

That is, the end cover 10 is provided with the liquid injection mechanism 11, which may inject an electrolyte into the single battery. After the completion of electrolyte injection, the end cover 10 is sealed by the liquid injection mechanism 11, the top adhesive sheet 30 is attached to the first surface of the end cover 10, and the terminal assembly 20 and the pressure relief mechanism 40 are avoided though the first opening 31 and the second opening 32 respectively, so as to avoid blocking the terminal assembly 20 or the pressure relief mechanism 40. It is ensured that the pressure relief mechanism 40 can realize rapid pressure relief when the internal pressure of the single battery is too high, the electrical connection stability between the terminal assembly 20 and components such as an external bus member may also be ensured, and the stable and reliable electrical connection between the two is ensured.

It can be understood that in the present application, the liquid injection mechanism 11 is completely covered by the top adhesive sheet 30, the liquid injection mechanism 11, as a region with a weak structure on the end cover 10, may leak, when the liquid injection mechanism 11 leaks, the part of the top adhesive sheet 30 right opposite to the liquid injection mechanism 11 may bulge (swell), which is convenient to rapidly identify whether there is leakage, so that the leakage of the end cover assembly 100, especially the leakage of the region where the liquid injection mechanism 11 is located is observed through naked eyes, the discovery difficulty is reduced, and the convenience of maintenance can be improved.

In this way, by setting the top adhesive sheet 30 on the end cover assembly 100 and making the top adhesive sheet 30 completely cover the liquid injection mechanism 11, the region where the liquid injection mechanism 11 is located and with the weak structure on the end cover 10 can be blocked, when the region where the liquid injection mechanism 11 is located leaks, the top adhesive sheet 30 bulges, so that when the liquid injection mechanism 11 cannot realize effective sealing, the naked-eye observation of the leakage can be realized, the discovery difficulty is reduced, and the convenience of maintenance is improved.

As shown in FIG. 2, in some embodiments, the liquid injection mechanism 11 includes a liquid injection hole 111 formed in the end cover 10 and a sealing nail 112 located in the liquid injection hole 111, and the top adhesive sheet 30 is pressed to cover the sealing nail 112.

Specifically, the liquid injection hole 111 is configured to inject the electrolyte into the housing 200, after the injection of the electrolyte is completed, the liquid injection hole 111 may be sealed through the sealing nail 112, the sealing nail 112 may be in threaded, inserted or interference fit with the liquid injection hole 111, and the top adhesive sheet 30 is pressed to cover the sealing nail 112, which can improve the fixing stability and reliability of the sealing nail 112 on the liquid injection hole 111, and ensure that the first surface of the end cover assembly 100 keeps flat. At the same time, an adhesion layer of the top adhesive sheet 30 may be absorbed with the sealing nail 112, when cooperation between the sealing nail 112 and the liquid injection hole 111 fails, the sealing nail 112 may be fixed through adhesion of the top adhesive sheet 30, the sealing nail 112 is prevented from piercing the electrode assembly 300, and the safety of the single battery can also be improved.

In some embodiments, a perpendicular projection of the top adhesive sheet 30 on the end cover 10 is completely located within a region enclosed by the edge of the end cover 10.

That is, a contour size of the top adhesive sheet 30 is smaller than a contour size of the end cover 10, so that the edge of the top adhesive sheet 30 is located within the edge of the end cover 10, it can be ensured that the top adhesive sheet 30 is attached to the first surface, the top adhesive sheet 30 does not need to be bent relative to the end cover 10, the phenomenon of edge cocking of the top adhesive sheet 30 can be avoided, and the attaching effect can be improved.

As shown in FIG. 3 and FIG. 4, further, a maximum length of the end cover 10 in the length direction is L5, and a maximum length of the top adhesive sheet 30 in the length direction is L6, which meet 1 mm≤L5-L6≤4 mm; and a maximum width of the end cover 10 in the width direction is W5, and a maximum width of the top adhesive sheet 30 in the width direction is W6, which meet 1 mm≤W5-W6≤4 mm.

That is, when one side edge of the top adhesive sheet 30 in the length direction is fitted with one side edge of the end cover 10 in the length direction, a distance between the other side edges of the two in the length direction is 1 mm-4 mm, and correspondingly, when one side edge of the top adhesive sheet 30 in the width direction is fitted with one side edge of the end cover 10 in the width direction, a distance between the other side edges of the two in the width direction is 1 mm-4 mm.

It can be understood that based on a parameter limitation between the first opening 31 and the terminal assembly 20 and a parameter limitation between the second opening 32 and the pressure relief mechanism 40, the adjustment margin of the top adhesive sheet 30 is smaller than 1 mm, and a minimum distance between the top adhesive sheet 30 and the end cover 10 in the length direction and the width direction is 1 mm, which can ensure that the top adhesive sheet 30 is located on the first surface of the end cover 10, and the top adhesive sheet 30 is completely attached to the end cover 10, the attaching effect is improved, the maximum spacing distance may not exceed 4 mm, the spacing distance is reasonable, and the insulation stability and reliability of the top adhesive sheet 30 can be improved.

As shown in FIG. 3, FIG. 4 and FIG. 5, a distance L7 between one side edge of the top adhesive sheet 30 in the length direction and the same side edge of the end cover 10 in the length direction meets: 0.5 mm≤L7≤2 mm; and a distance W7 between one side edge of the top adhesive sheet 30 in the width direction and the same side edge of the end cover 10 in the width direction meets: 0.5 mm≤W7≤2 mm.

That is, a unilateral distance between the two side edges of the top adhesive sheet 30 in the length direction and the two side edges of the end cover 10 in the length direction is 0.5 mm-2 mm, and a unilateral distance between the two side edges of the top adhesive sheet 30 in the width direction and the two side edges of the end cover 10 in the width direction is 0.5 mm-2 mm.

In this way, on the one hand, it can be ensured that the peripheral edge of the top adhesive sheet 30 is located within the peripheral edge of the end cover 10, the attaching effect is improved, it is ensured that there may be no phenomenon of edge cocking, and there is no bending region on the top adhesive sheet 30. Even if there are bubbles, the top adhesive sheet 30 can be smoothed manually to drive out the bubbles, and the removal of the bubbles is simple and convenient. On the other hand, distances on the side edges of the end cover and the top adhesive sheet 30 are more reasonable, and the attractiveness of the end cover assembly 100 can be improved on the premise of ensuring the insulation effect.

As shown in FIG. 5, according to some embodiments of the present application, two terminal assemblies 20 are disposed on the end cover 10, a spacing L10 between the two terminal assemblies 20 and the maximum length L4 of the pressure relief mechanism 40 in the length direction meet: 0.1≤L4/L10≤0.4.

Specifically, the positive terminal assembly and the negative terminal assembly are both disposed on the end cover 10, and the spacing between the two terminal assemblies 20 and the maximum length of the pressure relief mechanism 40 in a first length direction meet the above proportional relationship. In fact, based on the spacing between the two terminal assemblies 20, the size of the pressure relief mechanism 40 is further limited.

It can be understood that the larger the spacing between the two terminal assemblies 20, the larger the area of a region where the pressure relief mechanism 40 may be disposed correspondingly, the size of the pressure relief mechanism 40 is limited based on the spacing between the two terminal assemblies 20, which can prevent low pressure relief speed caused by too small pressure relief mechanism 40, so as to improve the safety, the pressure relief mechanism 40 may also be prevented from being too large, so as to reduce the probability of false triggering of the pressure relief mechanism 40 under the same pressure, and the working stability and reliability of the pressure relief mechanism 40 are improved.

An energy storage apparatus 1000 according to an embodiment of a second aspect of the present application includes the above end cover assembly 100.

It should be noted that the energy storage apparatus 1000 of the present application may be a single battery, a battery module, a battery cluster or a battery pack.

Exemplarily, the energy storage apparatus 1000 of the present application may be the single battery, the single battery includes: a housing 200, an electrode assembly 300 and the end cover assembly 100 in the above embodiment, and the housing 200 has an opening; the electrode assembly 300 is accommodated in the housing 200; and the opening is covered by the end cover 10 of the end cover assembly 100, and a second surface of the end cover 10 is disposed facing the electrode assembly 300.

The single battery refers to a minimum unit that constitutes the battery module, the battery cluster or the battery pack.

The housing 200 is a component configured to accommodate the electrode assembly 300, and the housing 200 may be of a hollow structure with an opening formed in one end, or of a hollow structure with openings formed in two ends. The housing 200 may be in various shapes, such as a cylinder and a cuboid. The housing 200 may be made of various materials, such as copper, iron, aluminum, steel and aluminum alloy.

There may be one or more electrode assemblies 300 in the housing 200.

The end cover assembly 100 is an assembly covering the opening of the housing 200 to isolate the internal environment of the single battery from the external environment.

It should be noted that in the present application, the single battery may include a lithium ion secondary battery, a lithium ion primary battery, a lithium-sulfur battery, a sodium-lithium ion battery, a sodium ion battery or a magnesium ion battery, which is not limited in the embodiment of the present application. The single battery may be in cylindrical, flat, cuboid or other shapes, which is also not limited in the embodiment of the present application. The single battery is generally divided into three types, namely a cylindrical single battery, a square single battery and a soft-roll single battery according to the packaging mode, which is also not limited in the embodiment of the present application.

The housing 200 is internally provided with the electrode assembly 300 and the electrolyte, and the electrode assembly 300 is composed of a positive pole piece, a negative pole piece and an isolating film. The single battery works mainly depending on movement of metal ions between the positive pole piece and the negative pole piece. The positive pole piece includes a positive current collector and a positive active material layer, a surface of the positive current collector is coated with the positive active material layer, the positive current collector that is not coated with the positive active material layer protrudes from the positive current collector that is coated with the positive active material layer, and the positive current collector that is not coated with the positive active material layer is used as a positive pole lug. The lithium ion battery is taken as an example, a material of the positive current collector may be aluminum, and a positive active material may be lithium cobaltate, lithium iron phosphate, lithium ternary or lithium manganate. The negative pole piece includes a negative current collector and a negative active material layer, a surface of the negative current collector is coated with the negative active material layer, the negative current collector that is not coated with the negative active material layer protrudes from the negative current collector that is coated with the negative active material layer, and the negative current collector that is not coated with the negative active material layer is used as a negative pole lug. A material of the negative current collector may be copper, and a negative active material may be carbon or silicon and the like. In order to ensure that there is no fusing when a high current passes through, a plurality of positive pole lugs are stacked together, and a plurality of negative pole lugs are stacked together. A material of the isolating film may be polypropylene (PP) or polyethylene (PE) and the like. In addition, the electrode assembly 300 may be of a winding structure, or a laminated structure, which is not limited in the embodiment of the present application.

Further, the development of a battery technology should consider various design factors at the same time, such as energy density, cycle life, discharge capacity, charge and discharge ratio and other performance parameters.

As shown in FIG. 2, in the single battery, the end cover assembly 100 generally includes an end cover 10, an electrode terminal and a connecting piece 21, the electrode terminal is fixed to the end cover 10 through the connecting piece 21, the electrode terminal is configured to be electrically connected with the electrode assembly 300, and the electrode terminal is a component for outputting electric energy of the single battery.

In order to ensure the connection between the electrode terminal and other components (such as a bus member), a size of the part, protruding out of an outer surface of the end cover 10, of the electrode terminal in the thickness direction of the end cover 10 is large, and the electrode terminal occupies a large external space of the single battery, so that the size of the single battery in the thickness direction of the end cover 10 is large. The terminal assembly 20 of the single battery occupies a large internal space of a box body, and the energy density of a battery is reduced.

In view of this, according to the present application, an abutting surface of the end cover 10 for abutting against the connecting piece 21 may be provided with a concave part 12, the concave part 12 is concave in the thickness direction of the end cover 10, and the concave part 12 is configured to accommodate one part of the electrode terminal.

In such end cover assembly 100, the abutting surface of the end cover 10 for abutting against the connecting piece 21 is provided with the concave part 12, and the concave part 12 can accommodate one part of the electrode terminal, so that one part of the electrode terminal sinks into the concave part 12, and the external space of the single battery occupied by the electrode terminal is reduced, which is conducive to increasing the energy density of the battery.

Exemplarily, the energy storage apparatus 1000 of the present application may be the battery pack, the battery pack includes a box body and a plurality of above single batteries, and the box body is configured to accommodate the single batteries.

The box body is a component for accommodating the single batteries, and the box body provides an accommodating space for the single batteries, and may be of various structures. In some embodiments, the box body may include a first part and a second part, and the first part and the second part are covered with each other, so as to define the accommodating space for accommodating the single batteries. The first part and the second part may be in various shapes, such as a cuboid and a cylinder. The first part may be of a hollow structure with one side opened, the second part may also be of a hollow structure with one side opened, and the opened side of the first part is covered with the opened side of the second part, so as to form the box body with the accommodating space. It may also be that the first part is of a hollow structure with one side opened, the second part is of a plate-shaped structure, and the opened side of the first part is covered with the second part, so as to form the box body with the accommodating space. The first part and the second part may be sealed through a sealing element, and the sealing element may be a sealing ring, a sealing adhesive and the like.

The battery pack referred in the embodiment of the present application refers to a single physical module that includes one or more single batteries to provide higher voltage and capacity. For example, the battery pack referred in the present application may include the battery module or the battery cluster. The battery pack generally includes a box body for encapsulating one or more single batteries. The box body may prevent liquid or other foreign matters from affecting the charging or discharging of the single batteries.

In the battery pack, there may be one or more single batteries. If there are a plurality of single batteries, the plurality of single batteries may be in series connection, parallel connection or mixed connection with one another, and the mixed connection refers to that there are both series connection and parallel connection among the plurality of single batteries. It may be that the plurality of single batteries are in series connection, parallel connection or mixed connection with one another to form a battery module, and then a plurality of battery modules are in series connection, parallel connection or mixed connection with one another to form a whole and be accommodated in the box body. It may also be that all single batteries are in direct series connection, parallel connection or mixed connection together, and then the whole composed of all single batteries is accommodated in the box body.

In some embodiments, the battery may further include a bus component, and the plurality of single batteries are electrically connected with one another through the bus component, so as to realize the series connection, parallel connection or mixed connection of the plurality of single batteries. The bus component may be a metal conductor, such as copper, iron, aluminum, stainless steel and aluminum alloy.

In the embodiments shown in FIG. 4 and FIG. 5, according to some embodiments of the present application, the energy storage apparatus 1000 further includes: a housing 200 covered with the end cover 10; and the housing 200 is coated with an insulating film 400, the insulating film 400 extends to cover the end cover 10, and a length L8 of the insulating film 400 extending along the end cover 10 from an edge of the end cover 10 is ≥2 mm.

Specifically, the end cover 10 is disposed to cover the housing 200, the housing 200 may be internally provided the electrode assembly 300, so as to form the single battery (referring to FIG. 6), the housing 200 is coated with the insulating film 400, which can realize the insulation of the housing 200 charged to delay oxidation, and the insulating film 400 extends to cover the end cover 10, which can improve the insulation effect of the insulating film 400 on the housing 200.

As shown in FIG. 5, further, a length of an overlapping region of the top adhesive sheet 30 and the insulating film 400 is 1 mm≤L9≤2 mm.

In this way, on the one hand, the top adhesive sheet 30 overlaps with at least part of the insulating film 400, which can ensure that the housing 200 and the end cover 10 are separated from the outside, so as to improve the insulation effect of the housing 200 and the end cover 10. On the other hand, an area of the overlapping region is more reasonable, which can improve the attaching stability and reliability of the top adhesive sheet 30, and effectively reduce the material cost.

It can be understood that the insulating film 400 is similar to the top adhesive sheet 30 in material, the peripheral edge of the top adhesive sheet 30 is attached to the insulating film 400, the attaching effect is better than that of the end cover, the insulating film 400 extends to cover the end cover, and further, at least part of the top adhesive sheet 30 overlaps with the insulating film 400, which can effectively improve the attaching stability and reliability of the insulating film 400 on the end cover, and reduce the material cost.

The technical solution described in the embodiment of the present application is further applicable to an electric device 01 using the energy storage apparatus 1000.

The electric device 01 may be a vehicle, a mobile phone, a portable device, a laptop, a steamship, a spacecraft, an electric toy, an electric tool and the like. The vehicle may be a fuel vehicle, a gas vehicle or a new energy vehicle, and the new energy vehicle may be a pure electric vehicle, a hybrid vehicle or an extended range electric vehicle and the like. The spacecraft includes an aircraft, a rocket, a space shuttle, a spaceship and the like. The electric toy includes a fixed or mobile electric toy, such as a game machine, an electric car toy, an electric steamship toy and an electric aircraft toy. The electric tool includes a metal cutting electric tool, a grinding electric tool, an assembly electric tool and a railway electric tool, such as an electric drill, an electric grinder, an electric wrench, an electric screwdriver, an electric hammer, an impact electric drill, a concrete vibrator and an electric planer. The above electric device 01 is not specially limited in the embodiment of the present application.

For the convenience of description, the following embodiment will take the electric device 01 being the vehicle as an example for description.

Figure 7:
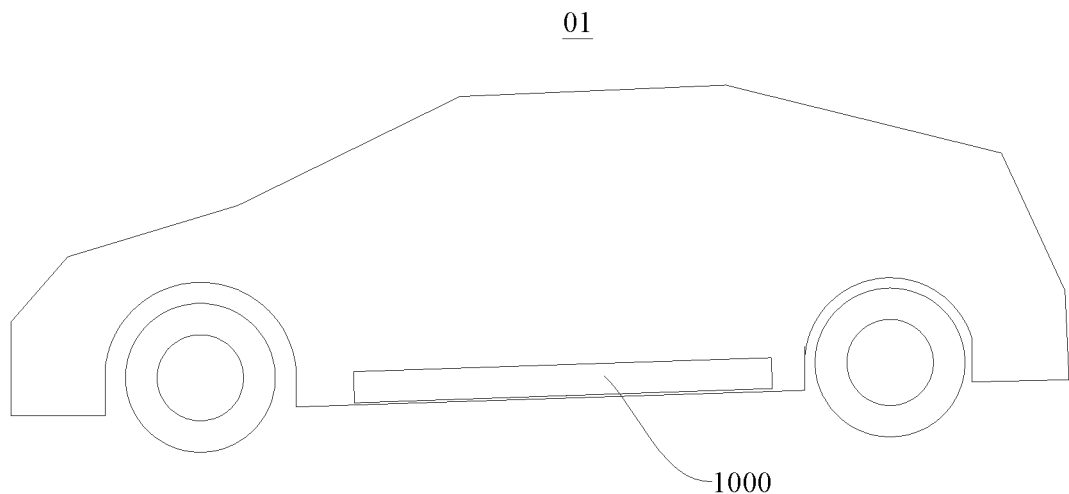
FIG. 7 is a schematic diagram of an electric device according to an embodiment of the present application.

Please refer to FIG. 7, which is a schematic structural diagram of a vehicle provided by some embodiments of the present application. The vehicle is internally provided with an energy storage apparatus 1000, which may be disposed at a bottom, head or tail of the vehicle. The energy storage apparatus 1000 may be used for the power supply of the vehicle, for example, the energy storage apparatus 1000 may be used as an operating power supply of the vehicle.

The vehicle may also include a controller and a motor. The controller is configured to control the energy storage apparatus 1000 to supply power to the motor, for example, for the work power demand during starting, navigation and driving of the vehicle.

In some embodiments of the present application, the energy storage apparatus 1000 may not only be used as the operating power supply of the vehicle, but also as a driving power supply of the vehicle, replacing or partially replacing fuel or natural gas to provide driving power for the vehicle.

In the description of this specification, referring to the description of the terms "embodiment", "example" and the like, it means that the specific characteristics, structures, materials or features described in combination with this embodiment or example are included in at least one embodiment or example of the present application. In this specification, the schematic expressions of the above terms do not necessarily refer to the same embodiments or examples. Moreover, the specific characteristics, structures, materials or features described may be combined in an appropriate manner in any one or more embodiments or examples.

Although embodiments of the present application have been shown and described, those skilled in the art can understand that a variety of changes, modifications, substitutions and modifications can be made to these embodiments without departing from the principles and purposes of the present application. The scope of the present application is defined by claims and their equivalents.

What is claimed is:

1. An end cover assembly, comprising:
   an end cover, the end cover having a first surface and a second surface opposite to each other in the thickness direction thereof;

a terminal assembly, the terminal assembly being disposed on the end cover;

a top adhesive sheet, the top adhesive sheet being attached to the first surface of the end cover, wherein the top adhesive sheet is provided with a first opening through which the terminal assembly penetrates, a maximum length L1 of the first opening in a length direction of the end cover and a maximum length L2 of the terminal assembly in the length direction meet: 0.6 mm≤L1-L2≤1 mm, a maximum width W1 of the first opening in a width direction of the end cover and a maximum width W2 of the terminal assembly in the width direction meet: 0.6 mm≤W1-W2≤1 mm, and a projection of the terminal assembly on the first surface in the thickness direction of the end cover is a first projection, wherein a contour of the first projection is circular, the first opening is circular, and a radius r1 of the first opening and a radius r2 of the first projection meet: 0.35 mm≤r1-r2≤0.45 mm; and a pressure relief mechanism, the pressure relief mechanism being disposed on the end cover, wherein the top adhesive sheet is further provided with a second opening through which the pressure relief mechanism penetrates, a maximum length L3 of the second opening in the length direction and a maximum length L4 of the pressure relief mechanism in the length direction meet: 0.6 mm≤L3-L4≤1 mm, a maximum width W3 of the second opening in the width direction and a maximum width W4 of the pressure relief mechanism in the width direction meet: 0.6 mm≤W3-W4≤1 mm; and a projection of the pressure relief mechanism on the first surface in the thickness direction of the end cover is a second projection, a contour of the second projection is oblong, the second opening is an oblong hole, and in the width direction, a radius r3 of a semicircular region of the second opening and a radius r4 of a semicircular region of the second projection meet: 0.35 mm≤r3-r4≤0.45 mm;

wherein a maximum length L5 of the end cover in the length direction and a maximum length L6 of the top adhesive sheet in the length direction meet 1 mm≤L5-L6≤4 mm; and a maximum width W5 of the end cover in the width direction and a maximum width W6 of the top adhesive sheet in the width direction meet 1 mm≤W5-W6≤4 mm;

wherein a distance L7 between one side edge of the top adhesive sheet in the length direction and the same side edge of the end cover in the length direction meets: 0.5 mm≤L7≤2 mm; and a distance W7 between one side edge of the top adhesive sheet in the width direction and the same side edge of the end cover in the width direction meets: 0.5 mm≤W7≤2 mm;

wherein two terminal assemblies are disposed on the end cover, and a spacing L10 between the two terminal assemblies and the maximum length L4 of the pressure relief mechanism in the length direction meet: 0.1≤L4/L10≤0.4.

2. The end cover assembly according to claim 1, wherein on the first surface, a gap C1 between the terminal assembly and the first opening meets: 0.35 mm≤C1≤0.45 mm.

3. The end cover assembly according to claim 1, wherein on the first surface, a gap C2 between the pressure relief mechanism and the second opening meets: 0.35 mm≤C2≤0.45 mm.

4. The end cover assembly according to claim 1, wherein the top adhesive sheet is provided with at least one third opening, so as to expose part of an outer surface of the end cover.

5. The end cover assembly according to claim 4, wherein the outer surface of the end cover is provided with at least one identification code, and the at least one third opening is disposed directly facing the at least one identification code.

6. An energy storage apparatus, comprising an end cover assembly, wherein the end cover assembly comprises:

an end cover, the end cover having a first surface and a second surface opposite to each other in the thickness direction thereof;

a terminal assembly, the terminal assembly being disposed on the end cover;

a top adhesive sheet, the top adhesive sheet being attached to the first surface of the end cover, wherein the top adhesive sheet is provided with a first opening through which the terminal assembly penetrates, a maximum length L1 of the first opening in a length direction of the end cover and a maximum length L2 of the terminal assembly in the length direction meet: 0.6 mm≤L1-L2≤1 mm, a maximum width W1 of the first opening in a width direction of the end cover and a maximum width W2 of the terminal assembly in the width direction meet: 0.6 mm≤W1-W2≤1 mm, and a projection of the terminal assembly on the first surface in the thickness direction of the end cover is a first projection, wherein a contour of the first projection is circular, the first opening is circular, and a radius r1 of the first opening and a radius r2 of the first projection meet: 0.35 mm≤r1-r2≤0.45 mm; and a pressure relief mechanism, the pressure relief mechanism being disposed on the end cover, wherein the top adhesive sheet is further provided with a second opening through which the pressure relief mechanism penetrates, a maximum length L3 of the second opening in the length direction and a maximum length L4 of the pressure relief mechanism in the length direction meet: 0.6 mm≤L3-L4≤1 mm, a maximum width W3 of the second opening in the width direction and a maximum width W4 of the pressure relief mechanism in the width direction meet: 0.6 mm≤W3-W4≤1 mm; and a projection of the pressure relief mechanism on the first surface in the thickness direction of the end cover is a second projection, a contour of the second projection is oblong, the second opening is an oblong hole, and in the width direction, a radius r3 of a semicircular region of the second opening and a radius r4 of a semicircular region of the second projection meet: 0.35 mm≤r3-r4≤0.45 mm;

wherein a maximum length L5 of the end cover in the length direction and a maximum length L6 of the top adhesive sheet in the length direction meet 1 mm≤L5-L6≤4 mm; and a maximum width W5 of the end cover in the width direction and a maximum width W6 of the top adhesive sheet in the width direction meet 1 mm≤W5-W6≤4 mm;

wherein a distance L7 between one side edge of the top adhesive sheet in the length direction and the same side edge of the end cover in the length direction meets: 0.5 mm≤L7≤2 mm; and a distance W7 between one side edge of the top adhesive sheet in the width direction and the same side edge of the end cover in the width direction meets: 0.5 mm≤W7≤2 mm;

wherein two terminal assemblies are disposed on the end cover, and a spacing L10 between the two terminal assemblies and the maximum length L4 of the pressure relief mechanism in the length direction meet: $0.1 \leq L4/L10 \leq 0.4$.

7. The energy storage apparatus according to claim 6, wherein on the first surface, a gap C1 between the terminal assembly and the first opening meets: $0.35 \text{ mm} \leq C1 \leq 0.45 \text{ mm}$.

8. The energy storage apparatus according to claim 6, wherein on the first surface, a gap C2 between the pressure relief mechanism and the second opening meets: $0.35 \text{ mm} \leq C2 \leq 0.45 \text{ mm}$.

9. The energy storage apparatus according to claim 6, wherein the top adhesive sheet is provided with at least one third opening, so as to expose part of an outer surface of the end cover.

10. The energy storage apparatus according to claim 9, wherein the outer surface of the end cover is provided with at least one identification code, and the at least one third opening is disposed directly facing the at least one identification code.

11. The energy storage apparatus according to claim 6, further comprising a housing, wherein the end cover is disposed to cover the housing; and the housing is coated with an insulating film, the insulating film extends to cover the end cover, and a length L8 of the insulating film extending along the end cover from an edge of the end cover is $\geq 2 \text{ mm}$.

12. The energy storage apparatus according to claim 11, wherein a length L9 of an overlapping region of the top adhesive sheet and the insulating film is $1 \text{ mm} \leq L9 \leq 2 \text{ mm}$.

13. An electric device, comprising the energy storage apparatus, wherein the energy storage apparatus comprises an end cover assembly, and the end cover assembly comprises:

an end cover, the end cover having a first surface and a second surface opposite to each other in the thickness direction thereof;

a terminal assembly, the terminal assembly being disposed on the end cover;

a top adhesive sheet, the top adhesive sheet being attached to the first surface of the end cover, wherein the top adhesive sheet is provided with a first opening through which the terminal assembly penetrates, a maximum length L1 of the first opening in a length direction of the end cover and a maximum length L2 of the terminal assembly in the length direction meet: $0.6 \text{ mm} \leq L1-L2 \leq 1 \text{ mm}$, a maximum width W1 of the first opening in a width direction of the end cover and a maximum width W2 of the terminal assembly in the width direction meet: $0.6 \text{ mm} \leq W1-W2 \leq 1 \text{ mm}$, and a projection of the terminal assembly on the first surface in the thickness direction of the end cover is a first projection, wherein a contour of the first projection is circular, the first opening is circular, and a radius r1 of the first opening and a radius r2 of the first projection meet: $0.35 \text{ mm} \leq r1-r2 \leq 0.45 \text{ mm}$; and a pressure relief mechanism, the pressure relief mechanism being disposed on the end cover, wherein the top adhesive sheet is further provided with a second opening through which the pressure relief mechanism penetrates, a maximum length L3 of the second opening in the length direction and a maximum length L4 of the pressure relief mechanism in the length direction meet: $0.6 \text{ mm} \leq L3-L4 \leq 1 \text{ mm}$, a maximum width W3 of the second opening in the width direction and a maximum width W4 of the pressure relief mechanism in the width direction meet: $0.6 \text{ mm} \leq W3-W4 \leq 1 \text{ mm}$; and a projection of the pressure relief mechanism on the first surface in the thickness direction of the end cover is a second projection, a contour of the second projection is oblong, the second opening is an oblong hole, and in the width direction, a radius r3 of a semicircular region of the second opening and a radius r4 of a semicircular region of the second projection meet: $0.35 \text{ mm} \leq r3-r4 \leq 0.45 \text{ mm}$;

wherein a maximum length L5 of the end cover in the length direction and a maximum length L6 of the top adhesive sheet in the length direction meet $1 \text{ mm} \leq L5-L6 \leq 4 \text{ mm}$; and a maximum width W5 of the end cover in the width direction and a maximum width W6 of the top adhesive sheet in the width direction meet $1 \text{ mm} \leq W5-W6 \leq 4 \text{ mm}$;

wherein a distance L7 between one side edge of the top adhesive sheet in the length direction and the same side edge of the end cover in the length direction meets: $0.5 \text{ mm} \leq L7 \leq 2 \text{ mm}$; and a distance W7 between one side edge of the top adhesive sheet in the width direction and the same side edge of the end cover in the width direction meets: $0.5 \text{ mm} \leq W7 \leq 2 \text{ mm}$; wherein two terminal assemblies are disposed on the end cover, and a spacing L10 between the two terminal assemblies and the maximum length L4 of the pressure relief mechanism in the length direction meet: $0.1 \leq L4/L10 \leq 0.4$.

14. The electric device according to claim 13, wherein on the first surface, a gap C1 between the terminal assembly and the first opening meets: $0.35 \text{ mm} \leq C1 \leq 0.45 \text{ mm}$.

15. The electric device according to claim 13, wherein on the first surface, a gap C2 between the pressure relief mechanism and the second opening meets: $0.35 \text{ mm} \leq C2 \leq 0.45 \text{ mm}$.

16. The electric device according to claim 13, wherein the top adhesive sheet is provided with at least one third opening, so as to expose part of an outer surface of the end cover.

17. The electric device according to claim 16, wherein the outer surface of the end cover is provided with at least one identification code, and the at least one third opening is disposed directly facing the at least one identification code.

18. The electric device according to claim 13, wherein the energy storage apparatus further comprises a housing, the end cover is disposed to cover the housing, the housing is coated with an insulating film, the insulating film extends to cover the end cover, and a length L8 of the insulating film extending along the end cover from an edge of the end cover is $\geq 2 \text{ mm}$.

19. The electric device according to claim 18, wherein a length L9 of an overlapping region of the top adhesive sheet and the insulating film is $1 \text{ mm} \leq L9 \leq 2 \text{ mm}$.

* * * * *